April 12, 1927.
H. SUIDA
1,624,811
CONCENTRATION OF DILUTE ACETIC ACID
Filed June 18, 1924
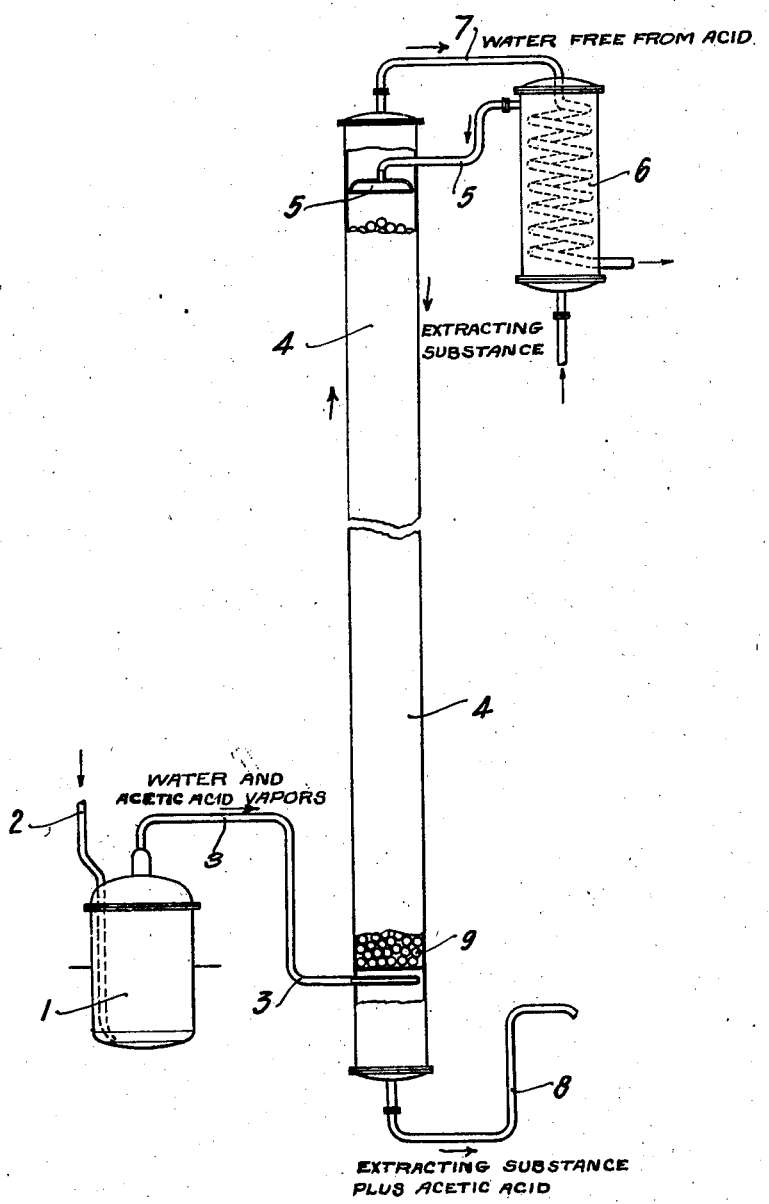

Patented Apr. 12, 1927.

1,624,811

UNITED STATES PATENT OFFICE.

HERMANN SUIDA, OF MODLING, AUSTRIA.

CONCENTRATION OF DILUTE ACETIC ACID.

Application filed June 18, 1924, Serial No. 720,812, and in Austria June 26, 1923.

The copending patent application Serial No. 720,811, filed of even date herewith relates to a process for the manufacture of concentrated acetic acid from diluted acetic acid, according to which process acetic acid can be extracted from its diluted aqueous solutions by means of solvents which are insoluble or soluble with difficulty in water, dissolve acetic acid and have a considerably higher boiling point than that of the pure acetic acid. The acetic acid thus extracted may be separated from the solvent in a more concentrated state, by suitable distillation. According to that process of extraction, as in all other hitherto known processes of extraction, acetic acid is extracted from its liquid aqueous solution by an extracting substance. According to German patent specification No. 312,539 of 1919, the extraction of acetic acid is also effected from its liquid aqueous solution, but it differs from the other processes in that a portion of the extraction means is introduced in the form of vapours, which shows that the process of said patent only uses extracting substances which have a lower boiling point than that of the aqueous acetic acid submitted to extraction.

It has been found that the efficiency of the method of working described in my copending application Serial No. 720,811, filed of even date herewith can be considerably improved by causing the diluted aqueous acetic acid under treatment to pass in the form of vapours in the opposite direction to the extracting substance which is still liquid at that temperature. The unexpected result of this modified method of working is that the extraction of acetic acid from its aqueous mixture is much more complete than when the extraction is carried out with both substances in the form of a liquid, under otherwise identical conditions and with the same height of the extraction column.

The accompanying drawing shows diagrammatically by way of example an apparatus for carrying out the process.

The diluted aqueous acetic acid is heated to boiling in a boiler 1 which is continuously fed with fresh diluted acetic acid through a pipe 2, and the escaping vapours of water and acetic acid pass through a pipe 3 into the bottom of a laterally arranged distilling column 4 of any desired construction, which is filled say with clay balls 9. On rising in the column 4, the vapours meet with a shower of the extracting substance of a higher boiling point admitted through a sprayer 5 at the top of the column and preferably preheated in a heat exchanger 6. The water vapours, almost completely deprived of acetic acid, escape at the top of the column 4 through a pipe 7 and are either condensed in an adjoining heat exchanger 6, or utilized elsewhere for secondary heating purposes. The extracting substance, which has absorbed the acetic acid from the vapours and is charged with acetic acid, passes while still hot at the bottom of the column 4 under the pipe 3 through siphon 8, and is used directly for conversion into concentrated acetic acid and solvent. For this purpose the solution is subjected to a fractional distillation in which the acetic acid is distilled off whereas the solvent remains practically free from acetic acid as a residue and is returned for re-use in the extraction process. The reason why the acetic acid passes in liquid state into the extracting substance in spite of the temperature in the column, is that the vapour tension of acetic acid in liquids which have a high dissolving capacity and a higher boiling point than acetic acid, is considerably reduced, while the water vapour tension does not experience any material reduction, since the water vapours are practically insoluble in the solvents used according to the invention. The solvents for carrying out the present process are chiefly suitable organic liquids containing oxygen, for instance, organic substances containing the hydroxyl group, with a boiling point above 150° C. Among them may be mentioned, monovalent phenols, except carbolic acid, such as cresols and polyvalent phenols more particularly in the form of their ethers, such as for instance guajacol, its homologues and similar phenols, hydrated phenols, for instance hexa-hydro-cresols, eliphatic and cyclic ketons with high boiling point, further fatty acids with high boiling point, and finally natural or artificial mixtures of the above-mentioned types of compounds, more particularly heavy wood tar oils, creosotes, brown coal tars and black coal tars.

What I claim is:

1. A process for the concentration of dilute acetic acid which comprises extracting the vapors of the dilute acid with a liquid solvent which has a boiling point above 150° C., said solvent having a high capacity for dissolving acetic acid but a low capacity for dissolving water, then treating the solvent containing the acetic acid to separate the acetic acid and returning the solvent for reuse in the process.

2. A process for the concentration of dilute acetic acid, which comprises extracting the vapors of the dilute acid with a liquid solvent which has a boiling point above 150° C., said solvent having a high capacity for dissolving acetic acid but a low capacity for dissolving water, then distilling the solvent containing the acetic acid to separate the acetic acid and returning the solvent for reuse in the process.

In testimony whereof I have hereunto set my hand.

HERMANN SUIDA.